Nov. 13, 1962 C. E. OTT 3,063,284
PLURAL POINTER DISPLACEMENT INDICATOR
Filed Feb. 27, 1959 3 Sheets-Sheet 1

INVENTOR
Clyde E. Ott
Strauch, Nolan + Neale
ATTORNEYS

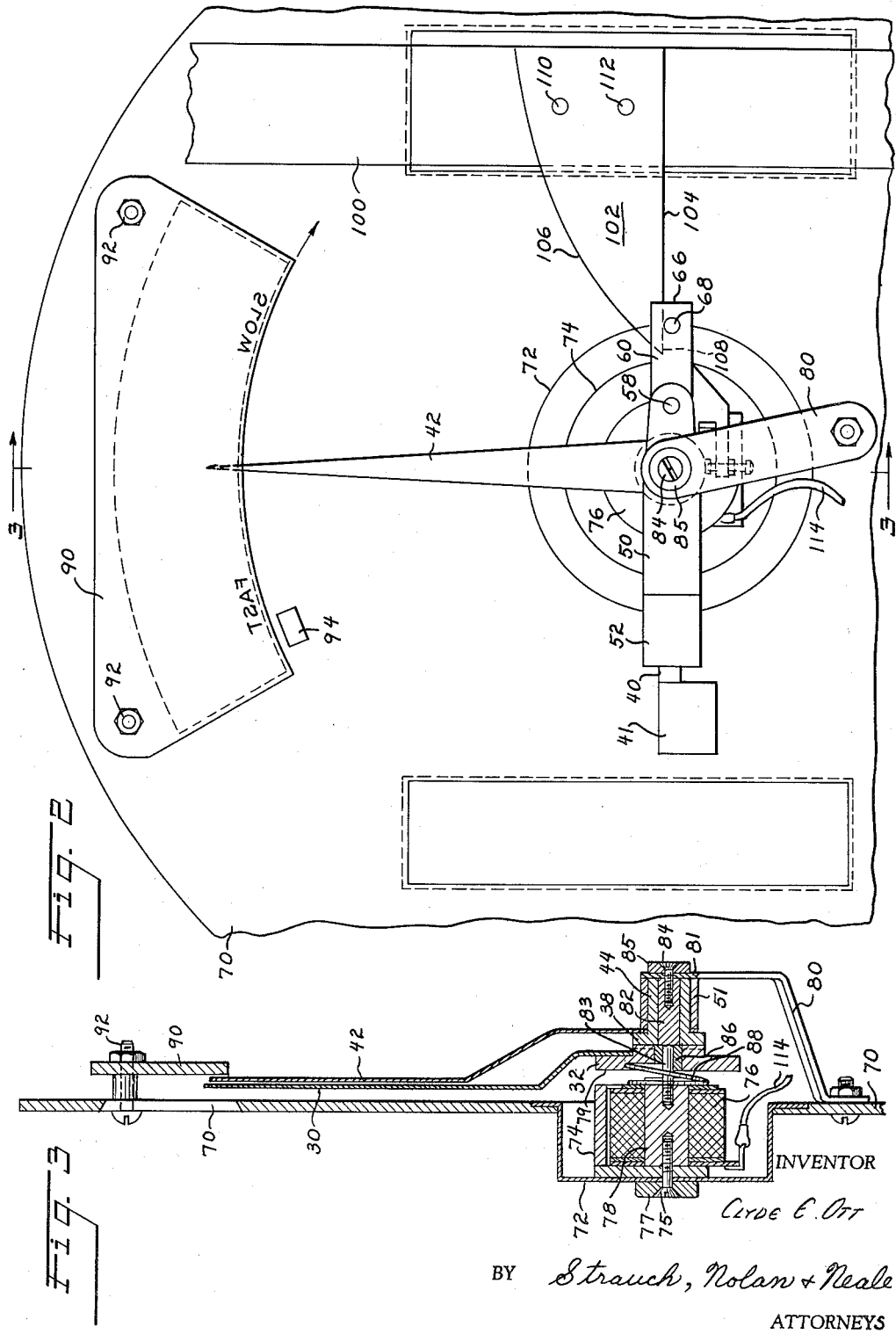

Nov. 13, 1962 C. E. OTT 3,063,284
PLURAL POINTER DISPLACEMENT INDICATOR
Filed Feb. 27, 1959 3 Sheets-Sheet 3
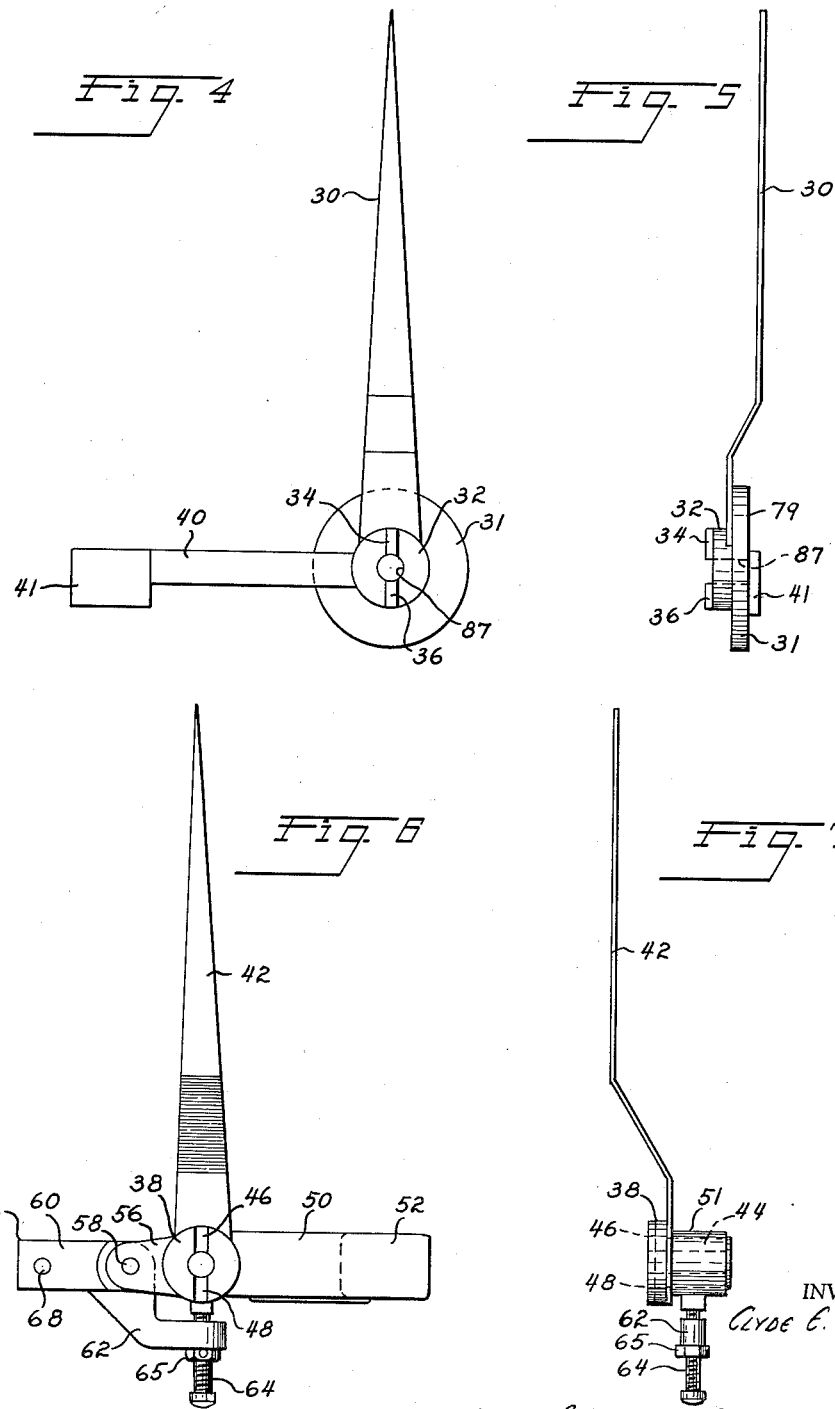
INVENTOR
Clyde E. Ott
BY Strauch, Nolan & Neale
ATTORNEYS

United States Patent Office 3,063,284
Patented Nov. 13, 1962

3,063,284
PLURAL POINTER DISPLACEMENT INDICATOR
Clyde E. Ott, Du Bois, Pa., assignor to Rockwell Manufacturing Company, Pittsburgh, Pa., a corporation of Pennsylvania
Filed Feb. 27, 1959, Ser. No. 796,028
9 Claims. (Cl. 73—3)

This invention relates to a quick-reading indicator for use in an electronically controlled gas meter prover, and more particularly to a plural pointer indicator adapted to make available instantaneous readings of quantities measured at two successive time intervals.

In prior gas meter provers, it has been the practice to pass a volume of a gas such as air through each gas meter after it is constructed to check its calibration. The registration on the meter indicator is compared with the displacement of the movable bell of the gas meter prover.

One problem associated with this type of prover is that the gas meter may have differing error percentages at different flow rates, and it is accordingly the practice in this art to test the accuracy of the meter at two flow rates, one reasonably fast and the other quite slow. The slow test takes considerable time to get a sufficiently accurate check on the calibration of the meter, and it is a time-consuming job for a workman to stand by to read the results of the first test and then initiate the second test at a differing flow rate, and then return to read the results of the second test before uncoupling the tested meter and positioning another in place to be tested.

An electronically operated programmer has been used for initiating the two testing operations at different flow rates and the programmer has been controlled by a photoelectric cell which is responsive to the moving pointers on the dial of the meter being tested. Thus, the time-consuming task has been simply reading the displacement of the movable bell after the gas flow has been cut off by the programmer following each test.

It is an object of the present invention to provide a novel quick-reading, plural pointer indicator for displaying an indication of the displacement of the movable bell during both the slow flow rate and fast flow rate tests after each testing cycle of a single gas meter.

Another object of the invention is to provide a novel plural pointer indicator where the position of each pointer is determined at two successive intervals with means to retain one of the pointers at the position at the first of said intervals while releasing the other pointer to move to a new position at the second of said intervals.

A further object of the invention is to provide in a plural pointer indicator an electromagnetic solenoid for retaining one of the pointers in a first position while the second pointer is free to move to another position.

Still another object of the invention is to provide a novel pointer construction and clutch arrangement for a plural pointer meter, both pointers of which are moved by the actuator for one pointer and the other pointer is selectively retained in its position to serve as a memory for an earlier meter indication. As a further feature, the actuator for the one pointer is mounted for pivotal movement in one direction only relative to the one pointer to prevent damage to the indicator in the event of unusual conditions.

These and other objects of the invention will become more fully apparent from the claims, and from the specification as it proceeds in connection with the appended drawings wherein:

FIGURE 2 is a rear elevation of the assembled reading head housing 10 for the prover system of FIGURE 1;

FIGURE 3 shows a section in elevation taken on line 3—3 of FIGURE 2;

FIGURES 4 and 5 are the rear and left-side elevations respectively of the forward or initial reading pointer sub-assembly; and FIGURES 6 and 7 are the front and right-side elevations of the rear or second reading pointer sub-assembly.

Figure 1:
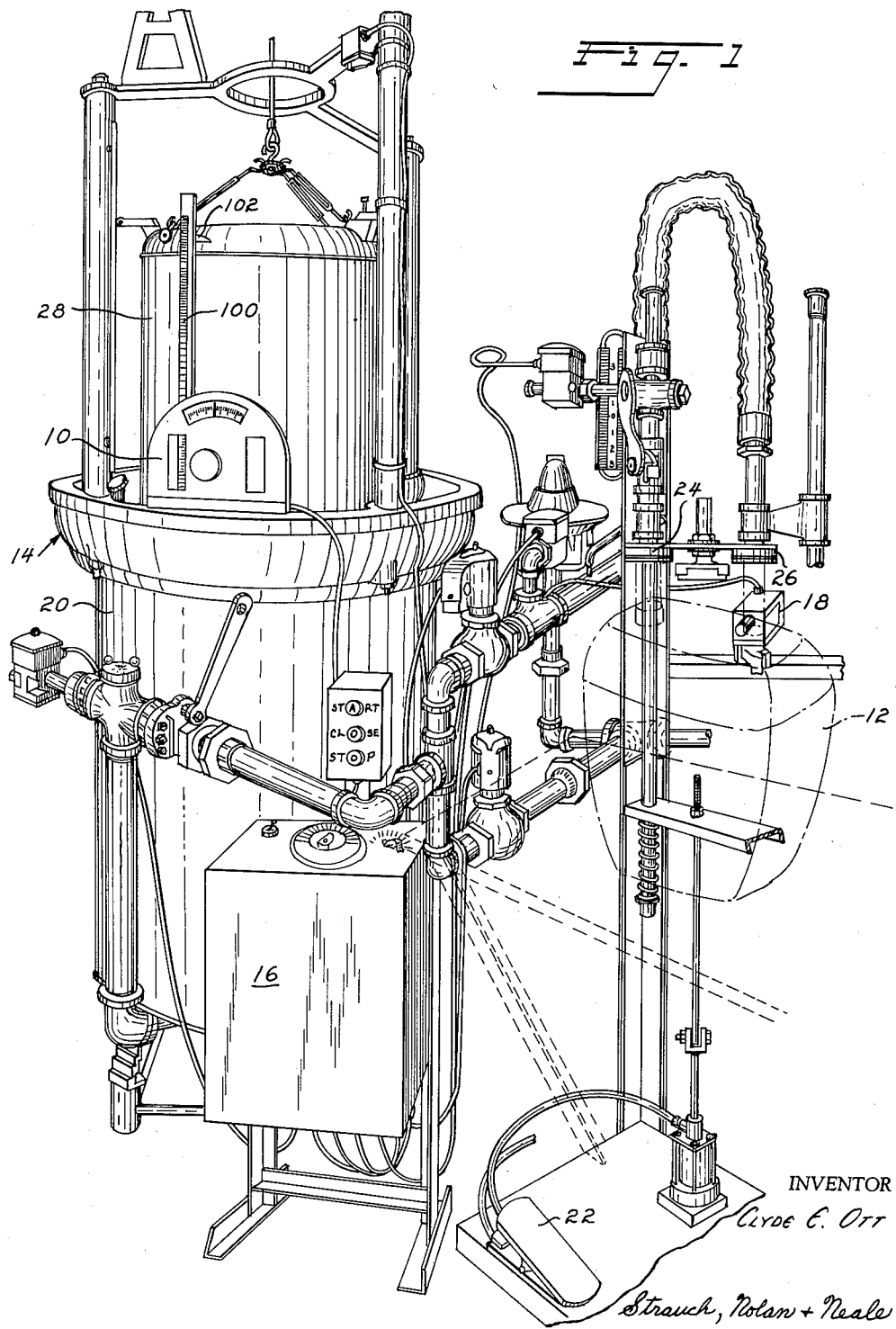
FIGURE 1 shows a gas meter prover system incorporating the present invention.

Referring now to the drawings the quick-reading dial head is illustrated in combination with a gas meter prover combination. The novel quick-reading dial head 10 of this invention is shown in FIGURE 1. The electronically controlled prover is for the purpose of checking the calibration of gas meters 12 (shown in phantom outline) from the assembly line as they are manufactured, and consists of a basic bell-type gas meter prover 14 equipped with solenoid valves and a programming unit 16 which operates the solenoid valves to provide a desired sequence of operation of the valves. Programming unit 16 is controlled by a photoelectric sensing unit 18 which is activated by the meter pointer of the gas meter being tested, all in a conventional manner.

In meter provers of this type, it is customary that the lower tank 20 of the bell prover 14 is filled with a liquid—preferably a light oil. A meter to be tested is placed in the test position, as shown in phantom lines 12 in FIGURE 1—so that the photoelectric sensing unit 18 focuses on the part of the dial of the gas meter immediately adjacent the meter pointer which usually indicates ½ cubic foot of fluid passed by the meter per revolution of the pointer. When the meter is in place, the operator presses a foot pedal 22 which pneumatically causes the fittings 24 and 26 to descend and sealingly connect with the gas meter inlet and outlet connections. The gas meter 12 is thus placed in the test circuit.

The programmer 16 controlled by the sensing element 18 causes the meter test to be run automatically at two different flow rates. Briefly, the sequence is as follows. The bell 28 of the prover 14 is filled with air, causing it to raise out of the tank of the prover and be displaced upwardly a predetermined distance to the position as shown in FIGURE 1. Valves are then opened to direct this air from the bell into the meter inlet connection. The revolutions of the pointer on the meter's own scale are detected by photoelectric sensing element 18, each revolution of the meter's pointer causing an electrical impulse to be sent to programmer 16. After a predetermined number of revolutions of the pointer on the gas meter being tested, the flow is stopped by programmer 16.

Bell 28 is then filled a second time, and the air is directed through the meter at a different flow rate. After the same volume of air as previously has been directed through meter 12 from bell 28 in the first test run is indicated by the meter's own pointer and detected by photoelectric cell 18, the flow is again stopped by programmer 16. The volume of air actually passed out of bell 28 on each test run can be determined with great precision by measuring its vertical displacement, and when compared with the volume of air indicated by the meter's own register, it is possible to accurately determine the accuracy of the gas meter tested. Thus, in one normal test run, bell 28 is allowed to force air through meter 12 until four revolutions of the meter's pointer have taken place, at which time the flow is suddenly stopped through a control circuit in programmer 16 actuated by photoelectric head 18. Four revolutions of the meter's pointer indicate that two cubic feet of volume of metered air has registered on the meter register. The height of bell 28 remaining above the surface of the liquid in the lower portion 20 of prover 14, as compared with the intial height of the bell, is used as an indication of how much air (by volume) has actually been passed through the meter. This change in height of the prover bell may be used to directly indicate the percentage error between the registered volume of air as indicated by the meter dial and the actual volume of air passed from the prover bell.

In practice programmer 16 allows the complete test on the meter to be run at two different flow rates without any action required by the operator other than setting the meter in place and depressing the "start" button. Reading head 10 of the present invention provides means for taking the reading of the test run at one flow rate and preserving it so that it will be available at the time a reading is obtained of the second test run at another flow rate. The operator is thus freed to perform other duties while the actual test runs are being made, since one test run is customarily at a very low flow rate requiring several minutes. Further, because of its mode of performance in the overall prover sequence, the quick-reader of the present invention is provided with a separate pointer for each test run cooperating with a scale which is calibrated to directly indicate the percentage error of the meter and show whether the meter is running "fast" or "slow" and by how much.

These functions of the quick-reader will become apparent from the following description with reference to FIGURES 2–7.

Referring now to FIGURES 4 and 5, the initial reading pointer 30 is rigidly secured to a cylindrical body 31 of a magnetizable material having on its front surface 32 as viewed in FIGURE 4 a clutch plate. Two axial projections or protrusions 34 and 36 on clutch plate face 32 form the clutch element which cooperates with a clutch drive plate 38 on the second pointer shown in FIGURES 6 and 7 in a manner described below. Also rigidly secured to body 31 is a lever arm 40 and weight 41 which provides a biasing force on the indicator sub-assembly for a purpose to be described. An internal bore 87 is provided through body 31.

The sub-assembly of FIGURES 6 and 7 is generally similar to that of the initial reading pointer sub-assembly illustrated in FIGURES 4 and 5. Pointer 42 is rigidly fastened to clutch drive member body 44, preferably of a non-magnetic material, as by soldering. Clutch plate 38 is the front surface on a generally cylindrical body 44 and is formed with radial grooves 46 and 48 in its front face as viewed in FIGURE 6. The grooves operatively coact with projections 34 and 36 on clutch plate 32 on the other pointer shown in FIGURES 4 and 5.

A counterweight lever comprises a lever arm 50 on a cylindrical body 51 which is secured in a suitable manner, such as being press fitted about clutch drive body 44 so that it is non-rotatably secured thereto. Counterweight 52 on lever 50 serves the same function as weight 41 on lever arm 40, as will be described below. A bifurcated end 56 on counterweight lever 50 extends radially beyond body 44 on the opposite side from weight 52 and is apertured to receive rivet 58. Pawl lever 60 fits between the bifurcated portions on end 56 of counterweight lever 50. Pawl lever 60 is apertured to rotate about rivet 58 and has a dog-leg portion 62 which receives a threaded adjusting screw 64 with lock-nut 65. As best shown in FIGURES 6 and 7, adjusting screw 64 bears against the bottom of cylindrical body 51 and may be used to adjust the angular position of pawl lever 60 about rivet 58 and thus provide a fine calibration adjustment for the pointers.

By this construction, the coaction of pawl lever 60 and cylindrical body 51 allows a downward force exerted on end 66 of pawl lever 60 to rotate clutch drive plate 38 and indicator pointer 42 in a counterclockwise direction as viewed in FIGURE 6, but prevents an upward force exerted on end 66 of pawl lever 60 from rotating pointer 42 in a clockwise direction since under an upward force, pawl lever 60 will merely pivot about rivet 58 without moving pointer 42.

Pawl lever 60 is also bifurcated at end 66 and the forked portions of pawl lever 60 are bridged by rivet or pin 68 so that the pawl lever 60 will coact, in a manner to be described, with a plate-like pawl on scale 100 movable with bell 28.

FIGURES 2 and 3 illustrate how the sub-assemblies of FIGURES 4–7 are incorporated in the assembled quick-reader meter of the present invention. The quick-reader meter consists of a front plate 70 to which is secured as by soldering, a cup-like element 72 which is a non-magnetic material such as brass. Within cup 72, a partial cup 74 surrounds a solenoid 76, having a core 78 which is secured to cups 72 and 74 as by screw 75 and washer 77. A rearwardly extending bracket 80 is bolted at one end to plate 70 as illustrated in FIGURES 2 and 3 and has a hole in its other end 81 which is coaxial with the core 78 of solenoid 76. A shaft 82 has an end 83 of reduced diameter which is threaded into solenoid core 78. The other end of shaft 82 is secured to bracket 80 by screw 84 and washer 85. Bushing 86 is placed about shaft 83 and fits inside bore 87 of clutch plate 32 of the initial reading pointer 30 sub-assembly of FIGURES 4 and 5 so that the entire pointer sub-assembly is rotatable about and shiftable along the axis of bushing 86. Clutch driving plate 38 of the second reading pointer 42 sub-assembly of FIGURES 6 and 7 is mounted for rotatable movement about shaft 82, and is prevented from shifting axially.

As shown in FIGURE 3, a coil spring 88 is interposed between the solenoid coil 76 and the rear surface 79 of clutch plate 32 to normally bias clutch plate 32 to the right as viewed in FIGURE 3 to be urged against clutch driving plate 38. When current is applied to solenoid 76, it attracts the ferrous clutch plate 32 and separates clutch plate 32 from clutch driving plate 38.

Scale plate 90 in FIGURE 2 is placed behind pointers 42 and 30 and secured to the quick-reading dial housing 10 by suitable fasteners 92. Scale plate 90 is suitably calibrated to show the percentage error of the meter directly.

A pointer stop 94 which is secured to plate 70 is provided to serve as a rest position for both pointers 30 and 42. Counterweight 41 on pointer 30 and counterweight 52 on pointer 42 provide the restoring or biasing forces to assure with certainty that the pointers will move to the rest position when released. Attached to bell 28 of the prover, as is clearly shown in FIGURE 1, is a scale 100. As bell 28 of the prover moves downwardly while the air is flowing through gas meter 12 being tested, scale 100 also moves downwardly. Rigidly attached to scale 100 near its upper end is a pawl 102 which moves with the scale. Pawl 102 is also shown in FIGURE 2, and has a lower straight surface 104 and an upper arched surface 106 joining at a pointed end 108.

In operation, the bell of the prover is raised to an accurately predetermined position to take in a precisely known amount of air. The counterweights 41 and 52 on levers 40 and 50 respectively will cause pointers 30 and 42 to move counterclockwise (FIGURE 2) until the pointers contact the stop bar 94. Since solenoid 76 is not actuated, clutch plate 32 is biased by spring 88 against clutch driving plate 38 and the projections 34 and 36 of clutch plate 32 cooperate with the grooves 46 and 48 on clutch driving plate 38 so that the two pointers 30 and 42 are—in effect—locked to each other.

As meter 12 in FIGURE 1 under test passes the air from bell 28 of the prover, the bell moves downwardly, so moving pawl 102. Since, in the test previously described the meter registered two cubic feet of air for each individual test run, the pawl 102 is located on scale 100 so that if exactly two cubic feet of air pass from the bell, the pawl 102 will contact rivet 68 on pawl 60 and bring both pointers 30 and 42 to the vertical zero position shown in FIGURE 2 just as bell 28 is stopped by programmer 16.

Thus, if exactly two cubic feet of air pass from the bell when the meter registers two cubic feet, the percentage error will be zero. If, on the other hand, a full two cubic feet of air does not pass from bell 28 while the register of the meter 12 is indicating two cubic feet, bell 28 will not lower as far as if two cubic feet were actually passed and the pointers 30 and 42 will come to rest at some point between stop 94 and the vertical position shown in FIGURE 2 indicating that the meter register is "fast." Conversely, if more than two cubic feet pass from the bell, the hands will be carried clockwise (FIGURE 2) beyond the vertical position before bell 58 stops indicating that the meter register is "slow."

After bell 28 is stopped by programmer 16, a switch contact, not shown, causes an electrical current to be applied through wires 114 to the solenoid coil 76 which causes the clutch plate 32 to be magnetically attracted—against the force of coil spring 88—to the solenoid core 78. This displacement of clutch plate 32 axially along bushing 86 results in it separating from clutch driving plate 38 and becoming rigidly retained or locked in the angular position that it had when bell 28 of the prover was stopped. Thus, the reading which will indicate the percentage error of the amount of fluid passed from prover bell 28 to the amount registered by meter 12 under test during the first run will be preserved so long as solenoid coil 76 remains energized. In practice, coil 76 remains energized until after the second test run, at a different flow rate, is completed.

Once bell 28 has stopped completely after the first test run and coil 76 is energized to preserve the first reading, the programmer 16 by controlling certain solenoid valves of the prover to open, causes bell 28 to again be filled with air for the second test run. As it is filled, bell 28 raises to its predetermined height as in the previous test run. As the bell raises, the pawl 102 on scale 100 moves upwardly away from rivet 68 attached to pawl lever 60 on the sub-assembly associated with pointer 42.

Due to the force provided by counterweight 52 and lever 50, the second pointer 42 moves in a counterclockwise direction as viewed in FIGURE 2 against stop 94 as soon as it is completely free from the influence of pawl 102. Because of the broken driving connection between pointers 30 and 42, as a result of the previously described magnetic attraction of solenoid 76, the movement of the second pointer 42 has no effect upon the initial reading indicated by pointer 30. Pointer 30 thus remains stationary, preserving the results of the first test run.

After bell 28 of the prover has risen to its predetermined position, programmer 16 causes the flow to be directed from under the bell to meter 12 under test, as in the first test run. As the air passes from under the bell, the bell descends and after the meter has registered two cubic feet of flow, the flow is again cut off by programmer 16. As before, pawl 102 will contact rivet 68 of pawl lever 60 causing pointer 42 to be moved clockwise as viewed in FIGURE 2 until the bell stops, so stopping pointer 42. Bell 28, scale 100, pawl 102 and pointer 42 all remain in this position because the test is ended. The operator then makes the readings indicated by both pointers 30 and 42. The meter is removed and a new meter then put in place to be tested. The operator will then depress the start button to initiate the test of the next meter and is free to perform other duties until both test runs have automatically taken place.

As has been stated, the vertical position of pointers 30 and 42 indicate zero error since the bell actually passes the same amount of air as the test meter registers when the bell stops in a position to cause the pointers 30 and 42 to stop in a vertical position in the embodiment illustrated. Calibrations may be provided on scale plate 90 on either side of the vertical zero position to indicate percentage error in progressively greater quantities outwardly from the zero position. The scales on the opposite sides of the zero position are labeled "fast" and "slow." A meter is said to be "fast" when its register indicates passage of a certain quantity of fluid but it has actually passed a lesser quantity. Thus, if pointers 30 and 42 provide a reading which is between the stop 94 and the vertical zero position, the reading is on the "fast" scale. In a like manner, if the bell progresses downwardly beyond the zero position, a reading on the "slow" scale is indicated since a greater volume has actually passed through the test meter than the meter has registered.

The purpose of the pivoting, one-way connection between the pawl lever 60 and the counterweight lever 50 is to allow the pawl 102 to be able to move upwardly past the pawl 60 should it get below. For example, if a highly defective meter should be tested, it is possible that the percentage error would be great enough to exceed the reading of scale 90, in which case the pawl 102 would continue to descend until rivet 68 cleared end 108 of the pawl 102. The counterweights 41 and/or 52 will immediately cause their pointers 30 and 42 to move counterclockwise in FIGURE 2 until the stop 94 was contacted. When bell 28 is raised, the pawl 102 will again contact rivet 68, this time from the bottom, as it passes. The pivotal connection of pawl 60 about rivet 58 on lever 50 will allow upward passage of the pawl 102 without damage to the mechanism. Further, the adjusting screw 64 with its associated lock nut 65 allows a final adjustment to be made to properly calibrate the quick-reader. Alternatively, pawl 102 could be secured on scale 100 through a pivotal connection, as for example by using only one of fasteners 110 and 112 shown in FIGURE 2 and a stop (not shown) to provide a driving force only when scale 100 moves downwardly.

The counterweights 41 and 52 insure that pointers 30 and 42 will be biased against the direction of their drive by pawl 102. Because of the relationship of end 108 on pawl 102 and rivet 68 on the free end 66 of pawl lever 60, the pointers 30 and 42 are moved only during a small increment of the total movement of pawl 102. If pawl 102 moves too far downwardly, end 108 slips off pin 68 and the pointers revert to their initial position against stop 94. Thus they cannot overrun and give an inaccurate reading.

Throughout this description, a test of a meter utilizing four revolutions of a ½ cubic foot per revolution test hand of the meter has been referred to. It will be appreciated that the type of gas meter being tested dictates the amount of fluid passed for each test run. Some larger gas meters, for example, have a test hand which makes one revolution for five cubic feet of fluid passed. In this case, the programmer 16 of the prover shuts off the flow through the meter after one revolution of the test hand. The prover bell, on the other hand, then passes approximately five cubic feet of fluid. Accordingly, the pawl 102 is so positioned on scale 100 that it will bring the pointers 30 and 42 to the vertical position when exactly five cubic feet of fluid have passed from the bell.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a scale plate, a pair of pointers mounted for independent pivotal movement in indicating relation with said scale plate, each of said pointers having a hub with an arm extending from said hub, a counterweight on each of said arms for biasing said pointers toward a reference position, means for controlling the pivotal movement of one of said pointers including a second arm on the hub of said one pointer extending in a direction angularly related to the other arm on said hub and to said one pointer, said second arm being pivotally mounted to said hub with adjustment means at said pivot mounting for calibrating said pointer, first means for urging said pointers to engage each other whereby both pointers move together, and second means acting in opposition to said first means to completely disengage said pointers and retain the other of said pointers in an indicating position determined by said one pointer while permitting said one pointer to move under the influence of said controlling means to an independent indicating position.

2. The combination as defined in claim 1 wherein said second means comprises an electromagnetic solenoid.

3. In combination with a scale plate, a pair of pointers mounted for independent pivotal movement in indicating relation with said scale plate, stop means for said pointers, weight means on lever arms individual to each pointer for urging said pointers against said stop means, means on one of said pointers for controlling the position of said pointer relative to said scale plate including a pawl level mounted to said pointer remote from said weight means for pivotal movement relative to said pointer, first means for urging said pointers to engage each other whereby both pointers move together, in accordance with a linear displacement of a driving member, and second means acting in opposition to said first means to disengage said pointers and retain the other of said pointers in a first indicating position determined by said one pointer while permitting said one pointer to move to a second indication position without changing the position of said other pointer from said first indicating position.

4. The combination as defined in claim 3 wherein said second means comprises an electromagnetic solenoid.

5. An indicator for determining linear displacement of a member comprising a scale plate, a pointer means mounted for pivotal movement in indicating relation with said scale plate, a pawl lever connected to said pointer means adapted to abut said member for controlling movement of said pointer in one direction of rotation only, said pawl lever being mounted on said pointer means for pivotal movement in the opposite direction of rotation relative to the direction of rotation of said pointer, and adjustable means on said pawl lever for calibrating said pointer.

6. An indicator for determining linear displacement of a member comprising in combination with a scale plate, a pair of pointers mounted for independent pivotal movement in indicating relation with said scale plate, means for controlling the pivotal movement of one of said pointers, first means for urging said pointers to engage each other whereby both pointers move together, and second means acting in opposition to said first means to disengage said pointers and retain the other of said pointers in an indicating position determined by said one pointer while permitting said one pointer to move under the influence of said controlling means to an independent indicating position, said means for controlling the pivotal movement of one of said pointers comprising a pawl lever adapted to abut said member for controlling movement of said pointer in one direction of rotation only, said pawl lever being mounted on said one pointer for pivotal movement in the other direction of rotation relative to said pointer, and adjustable means on said pawl lever for calibrating said pointer.

7. In a gas meter prover of the type having a movable bell mounted over a liquid filled chamber, the displacement of the bell from a predetermined position serving as a standard against which the accuracy of a gas meter under test is compared, a double pointer quick-reading indicator for measuring the accuracy of a gas meter under test at two rates of flow comprising a scale plate, a pair of pointers mounted for independent pivotal movement in an indicating relation with said scale plate, means for controlling the pivotal movement of one of said pointers in accordance with the displacement of the movable bell at a first displacement rate, first means for urging said pointers to engage each other whereby both pointers move together, second means acting in opposition to said first means to disengage said pointers and retain the other of said pointers in an indicating position determined by said one pointer while permitting said one pointer to move under the influence of said controlling means to an independent indicating position, and means for controlling the pivotal movement of said one pointer toward the position of said other pointer while said other pointer remains stationary in accordance with the displacement of the movable bell at a second displacement rate different from said first displacement rate whereby the two pointers give instantaneous comparison indications by substantially identical pointer positions to thereby indicate the accuracy of a gas meter being proved at two different metering rates.

8. In a gas meter prover of the type having a movable bell mounted over a liquid filled chamber, the displacement of the bell from a predetermined position serving as a standard against which the accuracy of a gas meter under test is compared, a double pointer quick-reading indicator for measuring the accuracy of a gas meter under test at two rates of flow comprising a scale plate, a pair of pointers mounted for independent pivotal movement in an indicating relation with said scale plate, means for controlling the pivotal movement of one of said pointers in accordance with the displacement of the movable bell at a first displacement rate, including a pawl lever mounted on said one pointer for pivotal movement in one direction of rotation only relative to said pointer and adjustable means on said pawl lever for calibrating the indication of said pointer, first means for urging said pointer to engage each other whereby both pointers move together, second means acting in opposition to said first means to disengage said pointers and retain the other of said pointers in an indicating position determined by said one pointer while permitting said one pointer to move under the influence of said controlling means to an independent indicating position, and means for controlling the pivotal movement of said one pointer in accordance with the displacement of the movable bell at a second displacement rate different from said first displacement rate whereby the two pointers give instantaneous comparison indications by substantially identical pointer positions to thereby indicate the accuracy of a gas meter being proved at two different metering rates.

9. The combination as defined in claim 1 wherein facing surfaces on the hubs for each pointer engage to cause both pointers to move together, and said facing surfaces contain a projection and a projection receiving slot for interlocking the two pointers so that when they move together, movement occurs with the pointers in identical indicating positions.

References Cited in the file of this patent

UNITED STATES PATENTS

| | | |
|---|---|---|
| 1,140,824 | Hopkinson | May 25, 1915 |
| 1,407,987 | Crane | Feb. 28, 1922 |
| 1,747,439 | Huettig | Feb. 18, 1930 |
| 2,085,345 | Tuttle | June 29, 1937 |
| 2,836,977 | Cook | June 3, 1958 |